UNITED STATES PATENT OFFICE.

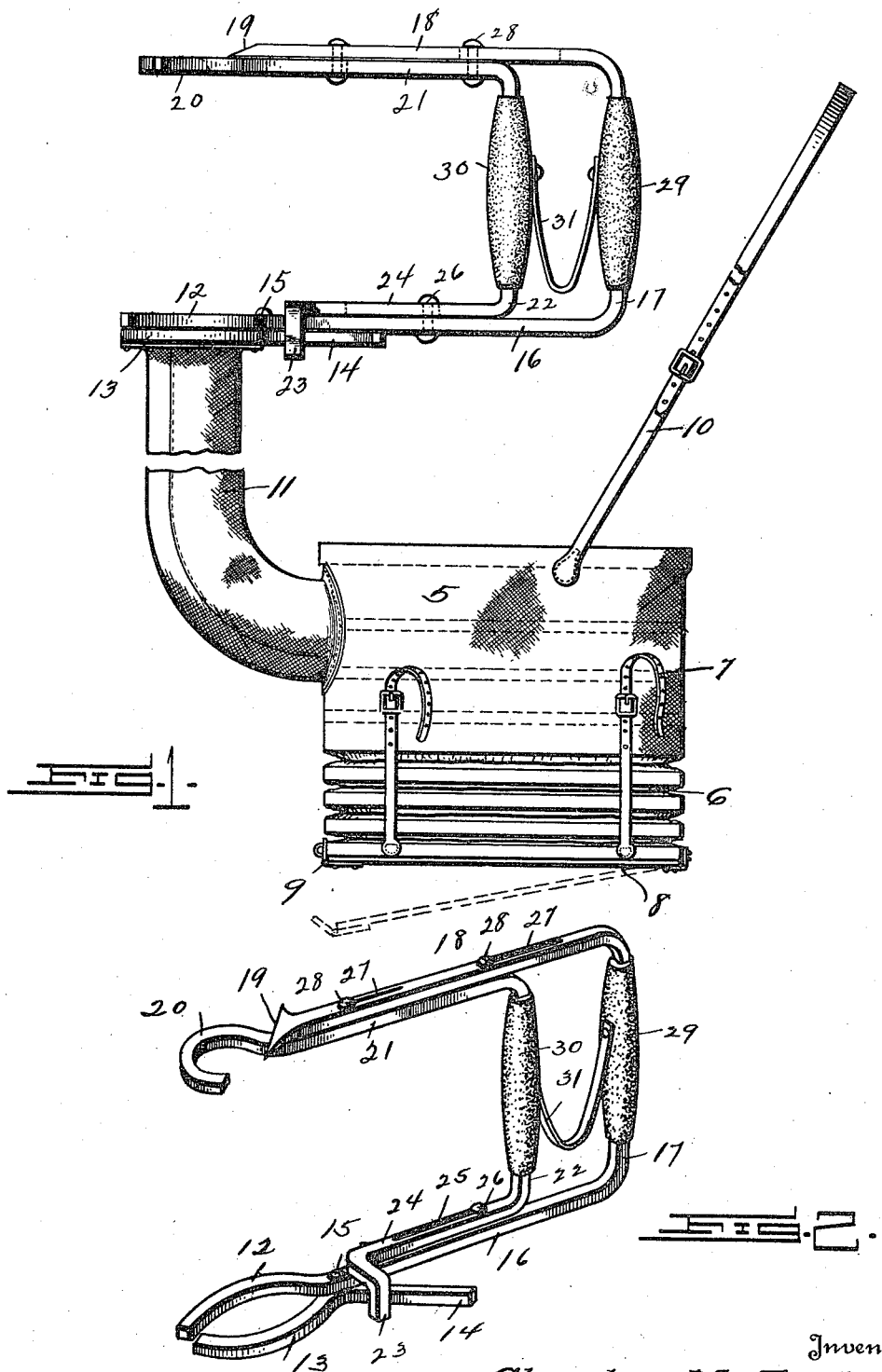

CHARLES M. FARBER, OF SAN DIEGO, CALIFORNIA.

FRUIT GAGE, CLIPPER, AND BAGGER.

1,176,728.  Specification of Letters Patent.  Patented Mar. 21, 1916.

Application filed December 9, 1915. Serial No. 65,946.

*To all whom it may concern:*

Be it known that I, CHARLES M. FARBER, a citizen of the United States of America, residing at San Diego, in the county of San Diego and State of California, have invented certain new and useful Improvements in Fruit Gages, Clippers, and Baggers, of which the following is a specification.

This invention relates to fruit gages, clippers and baggers, and more particularly to lemon pickers.

Heretofore it has been customary in picking lemons to use a sizing ring in one hand and a clipper in the other, the ring being used for sizing the fruit and the clipper being used to clip the stem of the fruit.

It is the primary object of the present invention to provide a simple and economical structure which will size the lemon and clip the stem of the same and deposit the picked lemon without such jar as would tend to bruise it, in a receptacle, the capacity of which may be varied at will.

Further objects and advantages of the invention will be set forth in the detailed description which now follows.

In the accompanying drawing:—Figure 1 is a side elevation of the lemon picker constructed in accordance with the invention, and Fig. 2 is a perspective view of the clipping and sizing elements thereof.

Like numerals designate corresponding parts in both of the figures of the drawing.

Referring to the drawing the numeral 5 designates a sack or other receptacle having a telescoping lower portion 6 so that the capacity of the sack may be varied by manipulating the straps 7. This sack is provided with a hinged bottom 8 provided with a fastening element 9 so that the picked fruit may be dumped from the bottom of the receptacle. Shoulder straps 10 provide means for supporting the bag from the shoulder of the user. A chute 11 leads from one side of the sack near the top thereof and the upper end of this chute is secured to the sizing element which consists of the prongs 12 and 13. The prong 13 carries a tail 14 and is pivoted at 15 to the prong 12. The prong 12 is carried by one of the legs 16 of a U-shaped member 17. The other leg 18 of this U-shaped member carries a blade 19 slidable over a hook 20 which serves to engage the stem of the lemon. This hook 20 is carried by one of the legs 21 of a U-shaped member 22. The other leg 24 of the U-shaped member 22 terminates in a downturned extension 23 which serves the purpose hereinafter set forth. The leg 24 of the second U-shaped member 22 is slotted at 25 for the reception of a pin 26 which engages the leg 16. Pin and slot connections 27 and 28 are likewise provided between the legs 18 and 21. Handles 29 and 30 are carried by the members 17 and 22 respectively and a flat spring 31 mounted between the handles normally keeps them separated.

The operation of the device is as follows: The fork formed by prongs 12 and 13 is used after the manner of the ring hereinbefore mentioned to size the fruit, that is, this fork is passed over the fruit and if the size of the fruit is closely approximate to the size of the fork, the operator knows that the fruit is in condition to have its stem severed, but if the sizing operation indicates that the fruit is too small then said fruit is left upon the tree to attain a larger growth. In carrying out the operation, the bringing of the sizing device into proper position to size the fruit also brings the knife into such juxtaposition to the stem of the fruit that an actuation of the blade 19 with relation to the hook 20 will result in severing the stem of the fruit; then when the handles 29 and 30 are drawn toward each other against the tension of the spring 21, the blade 19 is caused to travel over the hook 20 and sever the stem of the fruit. At the same time the extension 23 rides over the tail 14 and rocks the prong 13 upon its pivot 15 to open the sizing element and permit the fruit to fall freely into the chute 11 by which it is directed into the bag 5. It is desirable to thus arrange the parts, because, in order to bring the sizing and cutting elements to operative position in proper juxtaposition to the fruit, the sizing element must lie vertically beneath the knife and while said sizing element must closely conform to the size of the fruit during the sizing of the fruit, it must not interfere with the free dropping of the fruit after the latter is severed.

By reason of the fact that the bag 5 has a telescoping bottom the bag may be a shallow one at the start of the picking of the fruit and the depth of the bag may be increased as it fills with fruit. consequently there is no danger of the fruit being bruised by its fall into the bag.

It is of course apparent that many modifications may be resorted to without departure from the invention and it is to be understood that the invention is not limited to the precise construction set forth, but that it includes within its purview whatever changes fairly come within the spirit of the appended claims.

Having described my invention what I claim is:—

1. A fruit picker comprising in combination a knife and a sizing element, said sizing element being so related to the knife that the movement which brings the sizing element into operative position to size the fruit simultaneously brings the knife into such juxtaposition with relation to the stem of the fruit that a subsequent actuation of the knife will sever said stem.

2. A fruit picker comprising in combination a knife and a sizing element and means for actuating the knife and the sizing element simultaneously to impart a cutting movement to the knife and open the sizing element.

3. A fruit picker comprising a knife and a sizing element, a chute depending from the sizing element and means for actuating the knife and the sizing element simultaneously to impart a cutting movement to the knife and open the sizing element.

4. A fruit picker comprising a pair of members slidably mounted with relation to each other and comprising a knife and a sizing element lying in spaced relation and in substantial vertical alinement with each other and means for actuating the knife and the sizing element by the slidable movement of one of said members with relation to the other to thereby impart a cutting movement to the knife and open the sizing element.

5. A fruit picker comprising a pair of members slidably mounted with relation to each other and comprising a knife and a sizing element lying in spaced relation and in substantial alinement with each other and means for actuating the knife and the sizing element by the slidable movement of one of said members with relation to the other, and a fruit receiving chute depending from the sizing element.

6. In a device of the character described the combination with a pair of U-shaped members, springs normally tending to force said members apart, one of said members being slidably mounted with relation to the other, a knife mechanism carried by the legs of one side of said U-shaped members and a sizing element carried by the legs of the other side of said U-shaped members.

7. In a device of the character described the combination with a pair of U-shaped members, springs normally tending to force said members apart, one of said members being slidably mounted with relation to the other, a knife mechanism carried by the legs of one side of said U-shaped members, a sizing element carried by the legs of the other side of said U-shaped members, a chute depending from said sizing elements and bag into which said chute discharges.

8. In a device of the character described the combination with a pair of U-shaped members, springs normally tending to force said members apart, one of said members being slidably mounted with relation to the other, a knife mechanism carried by the legs of one side of said U-shaped members, a sizing element carried by the legs of the other side of said U-shaped members and lying vertically beneath said knife mechanism, a chute depending from said sizing element and a bag into which said chute discharges, said bag being variable in size.

9. In a device of the character described the combination with a pair of U-shaped members, springs normally tending to force said members apart, one of said members being slidably mounted with relation to the other, a knife mechanism carried by the legs of one side of said U-shaped members, a sizing element carried by the legs of the other side of said U-shaped members and lying vertically beneath said knife mechanism, a chute depending from said sizing element and a bag into which said chute discharges, said bag being variable in size, and a hinged bottom for said bag.

10. In a device of the character described the combination with a pair of U-shaped members, springs normally tending to force said members apart, one of said members being slidably mounted with relation to the other, a knife mechanism carried by the legs of one side of said U-shaped members, a sizing element carried by the legs of the other side of said U-shaped members, a chute depending from said sizing element and a bag into which said chute discharges, said bag being variable in size, a hinged bottom for said bag, and a supporting strap for said bag.

11. A fruit picker comprising a pair of U-shaped members, one of which is slidably mounted with relation to the other, the upper leg portion of one of said members carrying a hook and the upper leg portion of the other of said members carrying a knife which coöperates with said hook, a spring normally tending to force said members apart and a fork constituting a sizing element, one prong of said fork being mounted for pivotal movement with relation to the other and means for actuating said pivoted fork when one of said U-shaped members is slidably moved with relation to the other.

12. A fruit picker comprising a pair of U-shaped members, one of which is slidably mounted with relation to the other, the upper leg portion of one of said members carrying a hook and the upper leg portion of the other of said members carrying a knife which coöperates with said hook, a spring normally tending to force said members apart and a fork constituting a sizing element, one prong of said fork being mounted for pivotal movement with relation to the other, means for actuating said pivoted fork when one of said U-shaped members is slidably moved with relation to the other, and a chute depending from said sizing element.

In testimony whereof I affix my signature in presence of two witnesses.

CHARLES M. FARBER.

Witnesses:
J. C. HIZAR,
HENRY L. MASSEY.